United States Patent [19]

Rhyner

[11] Patent Number: 4,540,612

[45] Date of Patent: Sep. 10, 1985

[54] FOLDABLE SHEET PLASTIC PRODUCTS

[75] Inventor: Edison L. Rhyner, Chicago, Ill.

[73] Assignee: Sealtran Corporation, Chicago, Ill.

[21] Appl. No.: 290,369

[22] Filed: Aug. 5, 1981

[51] Int. Cl.[3] .................................................. B32B 3/30

[52] U.S. Cl. ........................................ 428/35; 428/43; 428/124; 428/172; 428/156; 40/10 D; 206/390; 206/395; 206/492

[58] Field of Search ...................... 428/13, 14, 78, 124, 428/156, 172, 43, 213, 136, 131, 35; 156/211, 268, 257, 204, 213, 216, 227, 270; 83/880, 881, 883; 264/293; 40/1.5, 10 D; 206/491, 492, 395, 390

[56] References Cited

U.S. PATENT DOCUMENTS 3,368,692 2/1968 Voller ............................ 156/257 X 3,547,752 12/1970 Janssen .......................... 428/131 X 3,963,124 6/1976 Banks ................................. 206/527

4,317,852 3/1982 Ogden ................................. 428/40

*Primary Examiner*—Alexander S. Thomas

*Attorney, Agent, or Firm*—Kinzer, Plyer, Dorn & McEachran

[57] ABSTRACT

An improved foldable sheet plastic construction, employed in a butterfly pouch for use in making plastic laminated data cards, and in a plastic fan-fold product, both comprising adjacent panels made from a single sheet of plastic material that must be folded along a fold line into parallel facing relation. The fold line has a two-level hinge cut. A major portion of the fold line is cut to a predetermined depth that assures easy folding but may cause separation of adjacent panels; a minor fractional portion of the fold line is cut to a substantially shallower depth to preclude separation of the panels on folding. In the preferred construction, the shallow cut is made at two or more spaced locations along the fold line to provide plural hinges.

7 Claims, 6 Drawing Figures

FIG. 1.
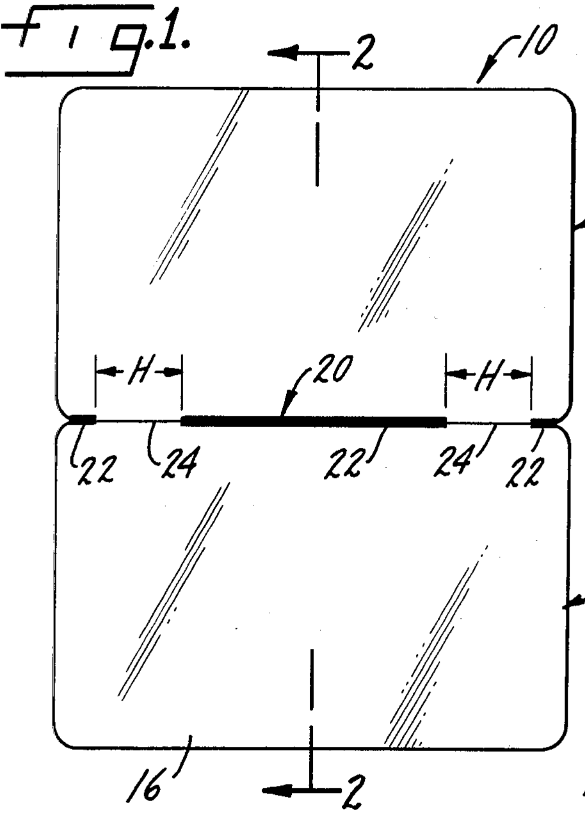
FIG. 2.
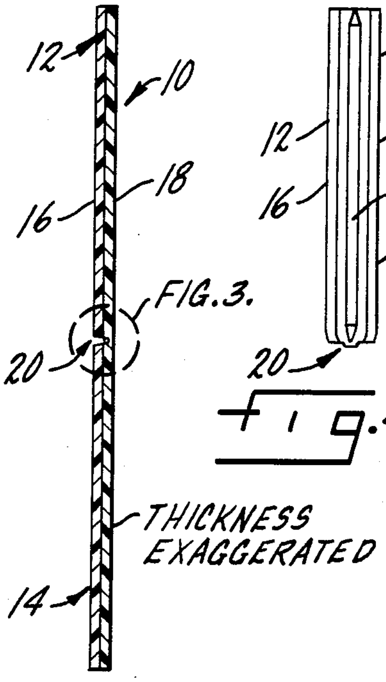
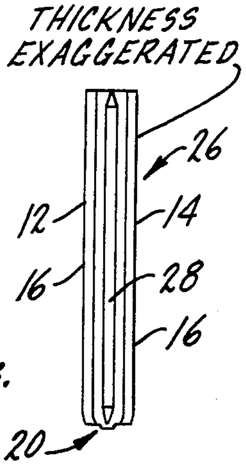
FIG. 4.
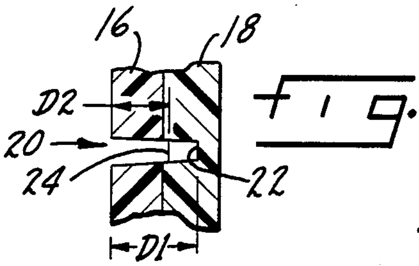
FIG. 3.
FIG. 5.
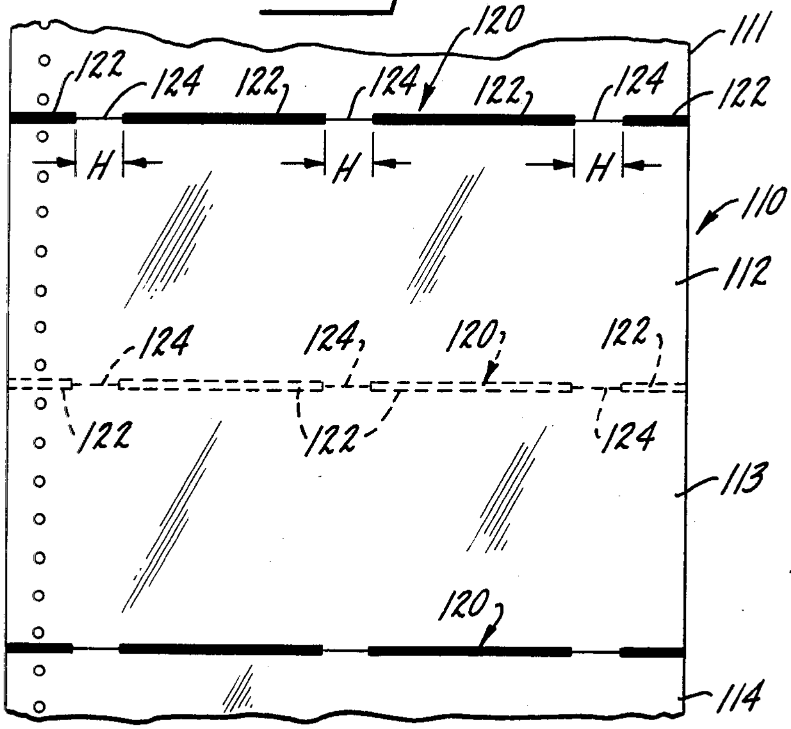
FIG. 6.
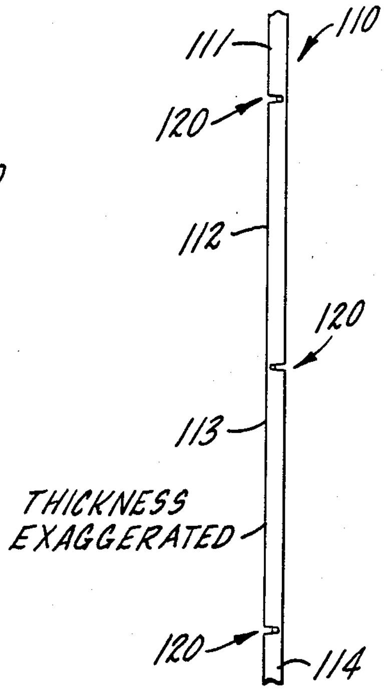

FOLDABLE SHEET PLASTIC PRODUCTS

BACKGROUND OF THE INVENTION

The use of laminated plastic data cards has increased rapidly in recent years. Large corporations, schools, governmental bodies, and other organizations regularly issue millions of cards annually. Unfortunately, the cost of equipment used in mass production of data cards is often prohibitive for an organization which needs to make only a few cards daily or which makes a moderate number of cards on only a few occasions each year. This has led to various medthods to produce plastic laminated data cards on a small scale basis, using only a minimum of equipment.

Some of these methods have merely called for inserting a data sheet between two sheets of plastic laminating material which are then subjected to heat and pressure to produce a laminate that is subsequently cut to a final desired shape. However, the cutting is time consuming, often inaccurate, and rather wasteful of the plastic laminating material.

Another method uses a pre-cut blank, formed from a single sheet of plastic material. The blank includes first and second panels, one of which is folded over on the other to form a so-called butterfly pouch. A document to be sealed is placed between the panels of the pouch, which are then laminated together under heat and pressure. To ensure that the blank is folded accurately, a fold line is cut into the plastic sheet at the juncture of the first and second panels.

One prevalent problem in cutting the fold line of a butterfly pouch is obtaining the proper depth of cut. Obviously, the fold line must be deep enough to sufficiently weaken the blank to ensure accurate folding. However, the fold line must not be cut so deeply as to cause the blank to separate when subsequently folded. The blanks are typically die-cut from a large sheet of plastic material. Since the sheet material is usually only a few mils in thickness, it can be seen that the depth of the score line must be quite accurately controlled. However, given the unavoidable tolerances in a commercial scale manufacturing operation, variations in the depth of cut cannot be economically avoided. Variations in the material thickness, the accuracy of the die cutting machine, and wear of the die's cutting edges all lead to variations in the depth of cut. Given the small thickness of the plastic material, even a minor variation in the cut can be a large percentage of the desired depth. The problem has been regarded as one of accommodating these variations during the production of a commercial number of blanks.

A similar problem exists in connection with computer print-out sheets intended to be retained on a permanent or semi-permanent basis. If a print-out is to be retained for long-term use, a plastic sheet is greatly preferable to paper as the base for the print-out. But a fan-fold arrangement, permitting folding of the print-out into a compact series of panels in parallel facing relation, tends to separate along the fold lines if the base is sheet plastic instead of paper. As in the case of the butterfly pouch, it is quite difficult to cut the fold lines deep enough to allow easy folding without incurring the possibility of panel separation along the fold lines. Indeed, the repeated folding and unfolding often encountered in use of a fan-fold product exacerbates the problem.

SUMMARY OF THE INVENTION

It is a principal object of the present invention, therefore, to provide an improved fold line construction for use in a plastic butterfly pouch or a sheet plastic fan-fold product, and an improved method for forming the fold line.

Another object is to provide a butterfly pouch, a fan-fold product, or other like plural panel sheet plastic products having improved fold lines which will not permit the products to separate along the fold lines when folded, yet assure easy and accurate folding.

Accordingly, the invention relates to the manufacture of a sheet plastic product, such as a butterfly pouch or a fan-fold product, comprising at least first and second panels of predetermined size and configuration formed from a single sheet of thin plastic material and having a fold line of given depth cut into the plastic sheet at the juncture of the two panels to permit folding the two panels along the fold line to bring the two panels together into parallel facing engagement. The improved method of forming the fold line comprises the steps of: cutting a major portion of a fold line defining the juncture between two panels in a sheet of thin plastic material, to a given depth D1; and cutting the remaining minor fractional portion of the fold line to a depth D2 substantially less than the depth D1 to assure retention of at least one alignment hinge when the panels are subsequently folded into parallel facing engagement, the alignment hinge assuring retention of the panels in joined relation without interference with folding.

BRIEF DESCRIPTION OF THE DRAWINGS

FIG. 1 is a plan view of a butterfly pouch, constructed in accordance with the present invention, showing the improved fold line schematically;

FIG. 2 is a sectional view taken approximately along line 2—2 in FIG. 1, with the thickness of the pouch material exaggerated for better understanding of the invention;

FIG. 3 is a detailed view of the fold line on a greatly enlarged scale;

FIG. 4 is a side elevation view of a completed laminated identification card made with the pouch of FIGS. 1–3, with thicknesses again exaggerated;

FIG. 5 is a plan view of a portion of a fan-fold plastic sheet, suitable for use as a computer print-out base and similar purposes, using fold lines formed in accordance with the present invention; and FIG. 6 is an edge view of the fan-fold product of FIG. 5, with the thickness exaggerated for better understanding of the invention.

DESCRIPTION OF THE PREFERRED EMBODIMENTS

FIGS. 1 and 2 illustrate a butterfly pouch 10 that includes first and second protective panels 12 and 14 respectively. The pouch 10 is die cut from a single sheet of plastic material, with the panels 12 and 14 of matched size and configuration.

One commonly used plastic material for the butterfly pouch 10 is of composite construction, having one surface formed of a tough, abrasion-resistant polyester resin, the opposite surface comprising a material, preferably another plastic, that serves as an adhesive for bonding the plastic to an identification card or other document and to any portion of the plastic extending beyond the edges of the document. The most common adhesive material is polyethylene. This composite polyester-polyethylene film has been successfully used for the protection of a wide variety of articles, including photographs, menus, identification cards, directional signs, and others. It will be understood that the present invention could be applied to any butterfly pouch, regardless of the document to be contained therein.

As shown in FIGS. 2 and 3 the composite sheet material for the pouch 10 includes two layers 16 and 18. The outer layer 16 is formed of a tough polyester resin such as polyethylene terephthalate, available commercially under the trade name "Mylar". The inner bonding layer 18, comprising a coating on one surface of the polyester film 16, is preferably formed of polyethylene. In typical laminating film, the outer polyester layer 16 may range in thickness from as low as about one-half mil (0.0005 inch) to about ten mils. The bonding layer 18 of polyethylene may have a thickness in the range of one mil (0.001 inch) to about six mils. Films of this composite construction are commercially available from a number of different suppliers, in varying thicknesses for each of the layers 16 and 18.

A fold line, indicated generally at 20, is cut into the pouch 10 at the juncture of the first and second panels 12 and 14. The fold line cut 20 weakens the pouch to permit accurate folding of the two panels 12 and 14 together into parallel facing engagement. The fold line 20 includes a major fractional portion 22 which is cut to a predetermined depth D1 (FIG. 3) sufficient to assure easy, accurate folding. The major fractional portion 22 of the fold line 20 is discontinuous; it is interrupted by a minor fractional hinge portion 24. The hinge portion 24 is cut to a depth D2 that is substantially less than the depth D1 of the major fractional portion 22. In FIG. 1 the depth variation of fold line 20 is illustrated schematically, with the thicker line for portion 22 indicating the deeper cut.

The depth D1 of the major fractional portion 22 of the fold line 20 may vary as required for the particular sheet material being used. In any event, the depth D1 should be sufficient to substantially weaken the pouch 10 along the fold line 20 so as to ensure that folding will occur along the fold line and not elsewhere. In some materials this may require a cut of approximately three-quarters or more of the thickness of the composite plastic material. In contrast, the minor fractional portion 24 may nominally extend about halfway through the thickness of the plastic material. This is the arrangement shown in FIG. 3. It will be realized that the thickness of the sheet plastic material and the depths D1 and D2 of the respective fold line cuts may be other than as shown and described, but that the basic relationship $D1 > D2$ is maintained.

As seen in FIG. 1, the minor fractional portion 24 of the fold line 20 comprises two separate segments. These segments form alignment hinges at the portions of the fold line indicated by the letters H. In a preferred embodiment the fold line 20 is formed in a single cutting operation using a rotary cutting die having two segments filed down so they will not cut as deeply as the rest of the die. These filed-down areas form the shallower cut 24. Steel rule and high die cutting techniques can also be used as desired.

A completed laminated product 26, using the butterfly pouch 10, is shown in FIG. 4. It includes a document 28 such as an identification card. The document is disposed between the first and second protective panels 12 and 14. The panels are folded along the score line 20. The panels are laminated together by the application of heat and pressure in the usual manner.

It can be seen that the fold line 20 of the present invention is able to compensate for the inevitable variations in thicknesses of the sheet plastic and in cutting depths encountered in commercial production. This is due to the fact that one or the other of the portions of the fold line will always perform as required. For example, if the major portion 22 of the fold line 20 is cut to an excessive depth, or if the plastic material is somewhat thinner than normal, the major fractional portion 22 of the fold line may extend so far into the plastic that it will cause separation of the two panels 12 and 14 when the pouch 10 is folded. However, the presence of the hinges H afforded by the shallow depth cuts 24 prevents such separation. Even though, in this situation, the hinges H are cut deeper than usual, they will still perform the essential function of holding the two pouch panels together. In the opposite situation, where the fold line 20 is not cut deeply enough, or when the plastic is somewhat thicker than normal in the region of the fold line, the minor fractional portion 24, comprising the hinges H, may be so shallow that if the entire fold line were at that depth the pouch would be difficult to fold. But the major fractional portion 22 still provides a deep enough fold line so that a fold can be readily and accurately made.

The problem of splits along the fold lines is most acute in those pouches and similar products in which a relatively thick (e.g., seven to ten mils) polyester film comprises the outer layer 16. On these products, the advantages of the invention are even more pronounced than for products in which the tough outer film is quite thin.

FIGS. 5 and 6 illustrate a fan-fold product 110, made in accordance with the present invention, that may be used as a base for a computer print-out intended for long term use, or for other similar applications. The fan-fold product 110 includes a series of individual panels 111, 112, 113 and 114 each separated from the adjacent panel by a fold line 120 cut into the sheet plastic constituting the base material of the product. In this instance the plastic sheet may be of uniform constituency throughout (e.g., a polyester resin) if no subequent lamination is required. On the other hand, if later lamination is intended, or if a more flexible plastic is desired for hinge purposes, a composite plastic sheet can be used as described in connection with the embodiment of FIGS. 1–4.

Each of the fold lines 120, FIGS. 5 and 6, includes a major portion 122 interrupted by three minor hinge portions 124. As before, the major portion is cut to a substantial predetermined depth, such as about three-fourths of the thickness of the plastic sheet. The minor hinge portions 124 are cut to an appreciably smaller depth, such as about half of the thickness of the plastic. Thus, the fold lines 120 correspond essentially to the detail construction shown for fold line 20 in FIG. 3. To facilitate fan-folding, alternate fold lines 120 are formed in opposite faces of the product 110, as shown.

The fan-fold product 110 and its method of manufacture afford the same advantages as the butterfly pouch 10. Variations in the depth of cut or in thickness of the plastic sheet are effectively compensated; the hinges H afforded by the minor fractional portions 124 of each fold line 120 assure retention of all of the panels 111–114 etc. in a unified structure even if splits occur along the major fractional portions 122. The major fractional portions 124, on the other hand, assure accurate folding along each fold line. As before, the fold lines 120 can be cut by rotary die, steel rule, or high die cutting processes.

I claim:

1. In an improved sheet plastic product of the kind comprising first and second panels of matched size and configuration formed from a single sheet of plastic material of nominal given thickness and having a fold line of predetermined depth D1, less than the thickness of the plastic sheet, cut into the plastic sheet at the juncture of the two panels to permit folding the two panels together into parallel facing engagement with each other, the improvement comprising a fold line cut to the predetermined depth D1 throughout most of the juncture between the two panels and cut to a preselected depth D2 substantially less than D1 in the remaining minor fractional portion of the fold line length to assure retention of at least one alignment hinge between the panels when the panels are folded together into parallel facing relation, in which the depth D1 is about three-fourths of the thickness of the sheet plastic material and in which the depth D2 is about one-half of the thickness of the sheet plastic material.

2. A sheet plastic product according to claim 1 in which the sheet plastic material includes a tough protective layer bonded to a thermoplastic adhesive layer, and in which the depth D1 exceeds the thickness of the layer into which the fold line is cut.

3. A sheet plastic product according to claim 1 in which the minor fractional portion of the fold line comprises at least two hinge segments displaced from each other along the fold line.

4. A sheet plastic product according to claim 1, comprising a butterfly pouch for use in the manufacture of a sealed protective cover for an identification card or like document, in which the panels are pre-cut to a size generally conforming to the size of the document to be protected, in which the sheet plastic material includes a tough outer protective surface layer bonded to a thermoplastic inner surface layer which is heat sealable to the document, and in which the depth D1 exceeds the thickness of the layer into which the fold line is cut.

5. A butterfly pouch according to claim 4, in which the minor fractional portion of the fold line comprises at least two hinge segments displaced from each other along the fold line.

6. A sheet plastic product according to claim 1, comprising a multi-panel fan-fold product suitable for use as a computer print-out base or the like, in which the minor fractional portion of each fold line includes plural hinge segments displaced from each other along the fold line.

7. A fan-fold product according to claim 6, in which alternate fold lines are cut into opposite sides of the sheet plastic material.

* * * * *